United States Patent [19]

Liet et al.

[11] 4,057,295

[45] Nov. 8, 1977

[54] SILO HAVING A CYLINDRICAL WALL AND A DISCHARGE DEVICE

[75] Inventors: Fredericus Liet; Cornelis Hendrikus Liet, both of Losser, Netherlands

[73] Assignee: Trioliet-Mullos Silo Nederland B.V., Losser, Netherlands

[21] Appl. No.: 597,510

[22] Filed: July 21, 1975

[30] Foreign Application Priority Data

July 22, 1974  Netherlands ..................... 7409901

[51] Int. Cl.² .......................................... B65G 53/50
[52] U.S. Cl. ...................................... 302/56; 52/192; 52/245; 214/17 DB
[58] Field of Search ................... 302/52, 56, 57, 58; 214/17 R, 17 D, 17 DB; 52/192, 195, 196, 245

[56] References Cited

U.S. PATENT DOCUMENTS

| 897,709 | 9/1908 | Boll | 52/245 |
|---|---|---|---|
| 1,100,081 | 6/1914 | Kramer | 52/196 |
| 1,265,966 | 5/1918 | Schlafly | 52/245 |
| 1,550,311 | 8/1925 | Foster | 302/56 X |
| 2,580,306 | 12/1951 | Leach et al. | 302/56 |
| 2,587,714 | 3/1952 | Embree et al. | 302/56 |
| 2,595,333 | 5/1952 | Clapp | 302/56 |
| 2,816,804 | 12/1957 | Harrer | 302/56 |
| 2,953,276 | 9/1960 | Dunn | 52/245 X |
| 3,308,973 | 3/1967 | Heitzman | 214/17 DB |
| 3,797,625 | 3/1974 | Price | 193/34 |

FOREIGN PATENT DOCUMENTS

| 1,214,842 | 4/1960 | France | 214/17 DB |
|---|---|---|---|
| 50,543 | 12/1940 | France | 52/245 |
| 621,699 | 5/1927 | France | 52/245 |
| 295,609 | 4/1932 | Italy | 52/245 |

OTHER PUBLICATIONS

"Zyro Metal Silos", Publication of the Canton Culvert Co., Canton, Ohio, 1913, pp. 1, 2, 12, 13.

*Primary Examiner*—John J. Love
*Assistant Examiner*—James L. Rowland
*Attorney, Agent, or Firm*—Snyder, Brown & Ramik

[57] ABSTRACT

A silo having a cylindrical wall comprising a discharging device, having a frame being vertically movable in the silo, in which a delivery tube having an eccentrical suction nozzle is rotatably arranged in a central bearing and comprising means for collecting the material stored in the silo into an annular heap corresponding to the course of the suction nozzle, said silo being constructed from substantially rectangular, slightly cylindrically curved, flanged sheets provided all around with bolt holes, at least one straight side of said sheets being not provided with a flange, whereas at least two adjacent sides are provided with a flange.

4 Claims, 14 Drawing Figures

FIG.1
FIG.5
FIG.2
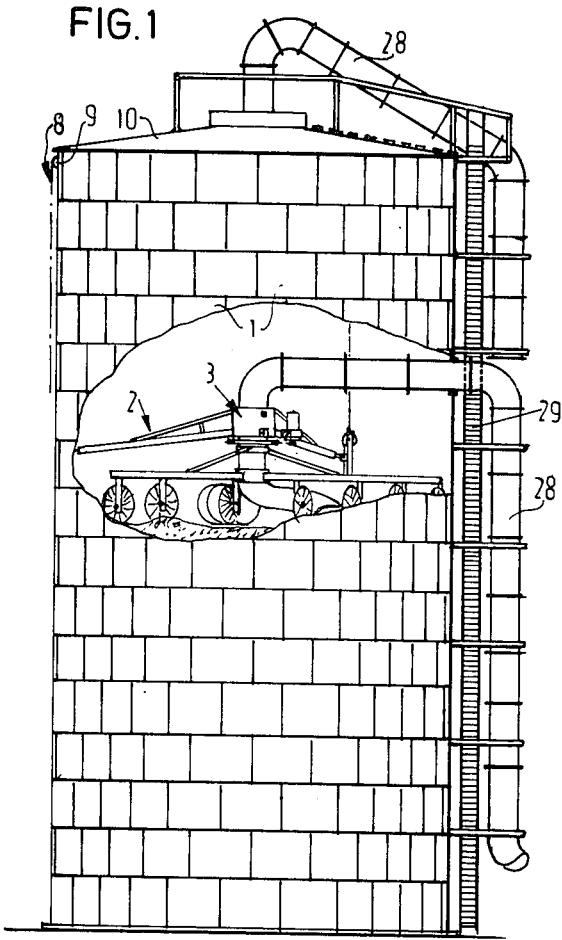
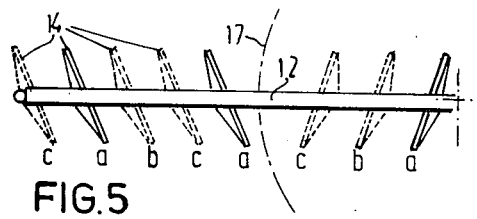
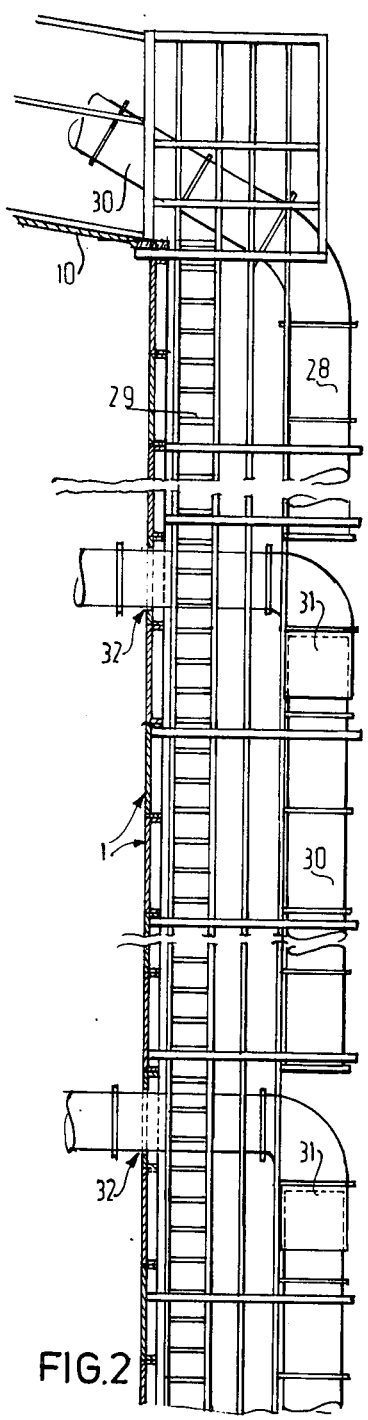

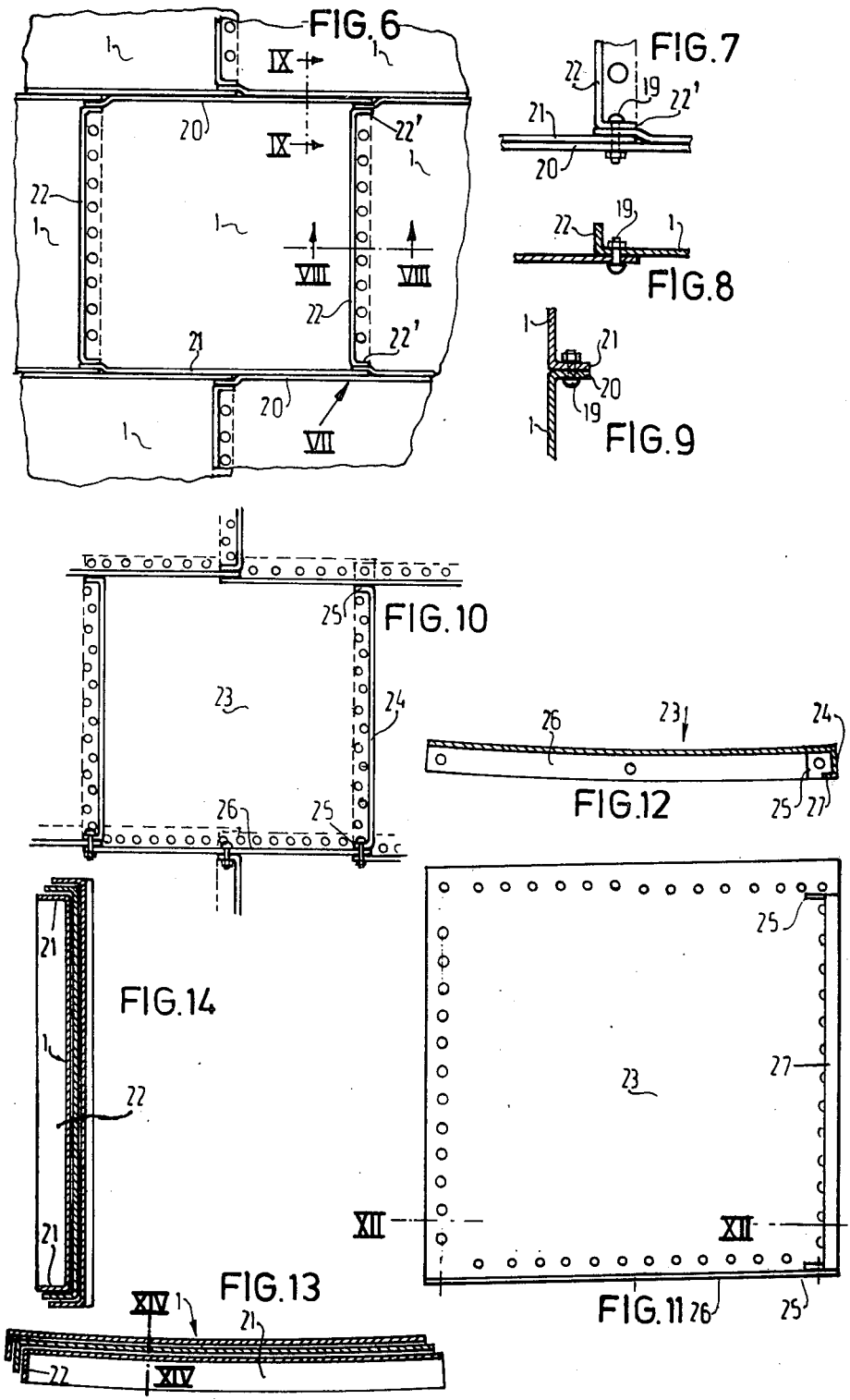

ial of the silo towards the heap is ensured.
SILO HAVING A CYLINDRICAL WALL AND A DISCHARGE DEVICE The invention relates to a silo having a cylindrical wall and comprising a discharge device having a frame adapted to be moved vertically by means of a hoisting device. Such silos are known in various structures and are intended for storing, for example, fodder such as grass and chopped maize, which will not flow out. Stowing and withdrawing such fodder into and out of silos respectively involve problems for the solution of which constructions have been designed, neither of which provides satisfactory results.

The invention provides a device and a method of improving the obviation of various disadvantages inherent to such silos.

To this end the invention proposes a method of emptying a cylindrical silo, in which the contents are collected in a heap and are sucked out by a vertically displaceable delivery tube, in which method the contents are collected in an annular heap concentrically located within the silo, the suction end of the delivery tube performing a circular movement along said heap. It is preferred to form a heap having a radius amounting from 1/6th to ⅓rd of that of the silo.

The invention furthermore relates to a silo of the kind set forth, to which the aforesaid principle is applied and which is characterized in that a vertical, central bearing is arranged in a frame, in which a delivery tube having an eccentrical suction nozzle is rotatably arranged and in that members are provided for collecting the stored material in an annular heap. The collecting members are preferably provided with a skeleton adapted to rotate with the suction tube and provided with sliding members inclined to the direction of movement of said skeleton. These sliding members may very satisfactorily be formed by wheels provided with circumferential pins, whose rotary axes are approximately located in a horizontal plane and are at an angle to the radius passing through the centre of the silo. These wheels are preferably conical, the apex of the cone being directed away from the heap so that an effective transport of the material of the silo towards the heap is ensured.

The sliding members are preferably fastened to a support associated with said skeleton, some supports having, for example, the shape of a star, whilst the sliding members are arranged in relatively off-set positions so that, when the star is rotated, the next sliding member transports the quantity of material displaced by the preceding member further towards the heap. Since such a silo is usually discharged without or with little watching of the operation it is important to minimize the risk of disturbance during the discharge. For this purpose the hoisting device is coupled, in accordance with the invention, with a circuit arrangement which causes the hoisting device to hoist the discharging device when the power absorption of the engine exceeds a given value and to lower the same when this power drops below a given, lower value and to stop it when said power lies in between these two values. In order to avoid redundant movements said circuit arrangement is preferably designed so that it energizes the hoisting device not until has the value concerned been exceeded for a given period of time.

In order to uniformly fill the silo, which is advisable with regard to an undisturbed operation of the discharging device and an uniform distribution of pressure on the wall of the silo, the arms of the rotatable skeleton are preferably provided with rake members displaceable between an operative position, in which they project beneath the sliding members and an inoperative position, in which they do not project. During the filling operation the product to be stored is shed into the silo and constantly raked to flatness by means of the rake members at the lower end of the revolving skeleton so that the product is deposited in horizontal layers, which facilitates the subsequent collection in heaps, whilst in addition the distribution of pressure on the silo wall becomes uniform.

The invention furthermore relates to a silo, the cylindrical wall of which is constructed from substantially rectangular, slightly cylindrically curved flanged sheets provided all around with bolt holes. Hitherto it hs been common practice to provide these sheets on four sides with flanges, which have bores for the relative fastening by means of bolts or rivets, whilst they served at the same time for stiffening the silo. In order to avoid that due to tangential forces produced in the cylindrical wall the vertical flanges bend outwardly to near the bolt holes, these flanges have been stiffened by rugged strips on either side thereof. It has now been found that the use of these strips can be omitted, which involves not only an important saving of material but also a considerable reduction of weight of the entire silo, when on one straight side the sheets are not provided with flanges and on at least two engaging sides the sheets are provided with a flange. On the flange-free sides the sheets can be secured to the adjacent flange by means of a welding seam. The sheets are preferably provided on only two engaging sides with flanges, which prevent the sheets from bending but which have no function in securing the sheets to one another.

In order to simplify the shape of the sheets to the optimum, which facilitates the manufacture thereof, it is advisable to cause the curved, flanged side of the sheets to diverge relatively to the row of bolt holes in the opposite side to an extent such that the space left on the straight side without flange exceeds that on the opposite side by the thickness of a sheet. In order to facilitate mounting it is furthermore advantageous to cause the rows of bolt holes along the straight sides of the sheets to diverge to an extent such that with a number of sheets assembled into a ring the inner diameter on one side of the ring is equal to the outer diameter on the other side thereof. In order to reduce leaks in the silo wall or the quantity of sealing material to be employed each sheet may be depressed at two opposite corners by the thickness of the material. Since on the straight side the flange is mainly subjected to kinking, it may be provided with a tag bent back substantially parallel to the sheet in order to enhance the resistance to kinking.

The feeding and delivery ducts are preferably formed partly by a vertical, rigid tube arranged at the side of the silo, at least part of which on the top side is detachable from the higher tube portion, which can thus be lowered telescopically with respect to the lower tube portion, whilst at the level of each telescopic portion and at the side thereof a hatch is provided in the silo wall. This vertical tube may satisfactorily be fastened by means of a cage structure to the silo, within which cage a ladder is arranged along the hatches so that the cage structure provides fastening of the tube and in addition together with the tube a protective cylinder for the ladder. For this purpose the horizontal distance between the rungs of the ladder and the opposite side of the cage is preferably 50 to 80 cms. As a matter of course, the ladder may form part of the cage structure.

In order to obtain a ready displacement of the skeleton across the silo it is provided with guide wheels bearing on the inner wall of the silo and with protective members above said wheels, located at the top side at a distance of 3 to 12 mms from the silo wall. These protective members prevent the material stored in the silo from getting in between the wheels and the silo wall, in which case the skeleton would be jammed.

The invention will be described with reference to the accompanying drawing of a few preferred embodiments of the invention.

FIG. 1 is a partly exploded view of the silo in accordance with the invention provided with a discharging device.

FIG. 2 shows on an enlarged scale part of the delivery tube of the device shown in FIG. 1.

FIG. 5 shows schematically the arrangement of the sliding members of the discharge device.

FIG. 6 is an elevational view of a wall portion of the silo.

FIG. 7 is an enlarged view of a detail of FIG. 6.

FIG. 8 is a sectional view taken on the line VIII—VIII in FIG. 6.

FIG. 9 is a sectional view taken on the line IX—IX in FIG. 6.

FIG. 10 is an elevational view of part of the wall of the silo in a modified embodiment.

FIG. 11 is an elevational view of a sheet for use in a silo.

FIG. 12 shows the sheet of FIG. 11 in a sectional view taken on the line XII—XII in FIG. 11.

FIG. 13 is partly a sectional view of a set of relatively fitting sheets of the kind shown in FIG. 6.

FIG. 14 is a sectional view of a pair of relatively fitting sheets taken on the line XIV—XIV in FIG. 13.

Figure 3:
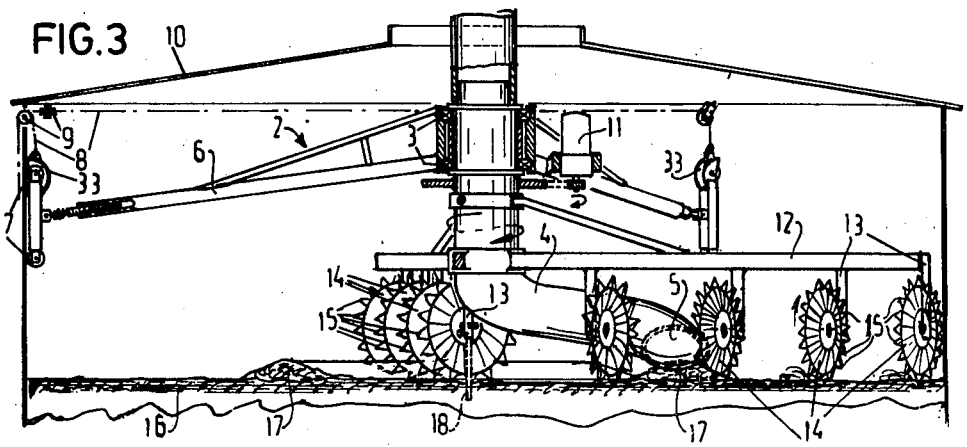
FIG. 3 is partly a sectional view and partly an elevational view of the frame of the discharging device, displaceable in the silo.

Referring to FIG. 1, a silo for storing, for example, grass and chopped maize is assembled by substantially rectangular, slightly cylindrical curved wall sheets 1. Inside the silo a frame 2 is vertically movable by means of a hoisting device and is provided with a vertical, central bearing 3, in which a delivery tube 4 with an accentrical suction nozzle 5 is rotatably arranged, said frame having members for collecting the material stored in the silo into an annular heap.

In order to prevent clogging of the suction nozzle 5 during the rotary movement across the long, usually fibrous material, the opening of the nozzle is located preferably in a plane inclined downwards in the direction of movement or a horizontal plane. In other terms, the suction nozzle does not open out on the front side of the suction tube 4.

Figure 4:
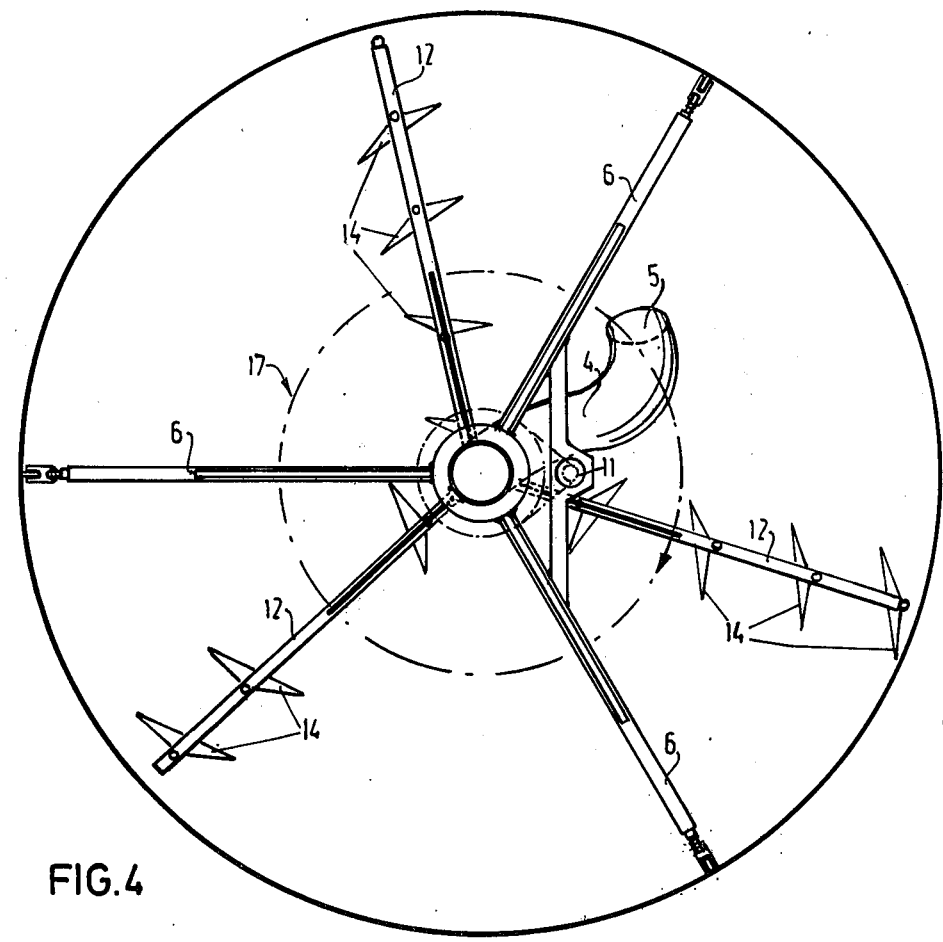
FIG. 4 is a plan view of the silo and frame with certain elements removed for clarity.

As is shown on an enlarged scale in FIG. 3 and in a plan view in FIG. 4, the frame is provided with three sets of projecting arms 6, which bear by means of rollers 7 on their ends on the inner wall of the silo and keep the bearing 3 in a central position in the silo. The frame 2 can be moved up and down by means of cables 8, which are secured to the ends of the arms 6 and are guided along pulleys 9, which are fastened near the roof 10 of the silo.

Beneath the frame 2 a skeleton 12 is arranged so as to be rotatably journalled together with the delivery tube 4 in the bearing 3 and to be driven by means of the motor 11 secured in the frame. The skeleton formed by radial supports is rotatable together with the delivery tube 4. Near the lower side of the radial supports 12 vertical transverse bars 13 are arranged at given radial distances in positions inclined to the direction of movement, said bars supporting freely rotatable wheels 14. These wheels are provided at the circumference with projecting pins 15. The wheels 14 are secured to the radial supports at such places that during the rotation of the skeleton, the following wheel held by the radial support 12 succeeding in the direction of movement further displaces the material 16 displaced by the preceding wheel. According to the invention the filling of the silo is thus assembled in an annular heap 17, the radius of which is 1/6th to ⅔rds of the radius of the silo. For this purpose the outermost wheels 14 are arranged in inclined positions such that the filling is displaced inwardly, whereas the innermost wheels are arranged so that the filling is displaced outwardly. As a matter of course, the suction nozzle 5 of the delivery tube has to perform a circular movement with substantially the same radius as that of the annular heap. The disposition of the preferably conical wheels, the apices of which are directed away from the heap 17, is shown schematically in FIG. 5. This Figure shows one radial support 12 carrying the wheels 14a. The two outermost wheels convey the material inwardly and the inner wheel conveys it outwardly towards the heap 17 indicated by broken lines. In this Figure the radial distance of the wheels 14 on the preceding radial support and on the next-following radial support, viewed in the direction of rotation, is designated by c and b respectively and indicated by broken lines. From this schematic Figure it is apparent that the product displaced by the wheels a is further conveyed subsequently by the wheels b, the wheels c and again by the wheels a until the annular heap 17 is formed.

In order to rotate the rotatable skeleton 12 with the loosening members a motor 11 is provided in the frame. When the power absorbed by the motor exceeds an empirically determined value, this indicates that the loosening members penetrate too deeply into the contents of the silo so that the discharging device has to be lifted. For this purpose a motor arranged on the outer side of the silo can be energized to wind up hoisting cable 8 to which the discharging device is suspended, and which extend upwardly along the outer side, then around pulleys 9 located near the roof of the silo and subsequently along the inner side of the silo in downward direction.

When the power absorbed drops below a given value, this indicates that the loosening members do practically not penetrate or do not at all penetrate into the contents of the silo so that a reverse movement has to be carried out. In between said two values the device has to remain at the same height. Since the top face of the contents is usually not flat, the hoisting device should not be enabled immediately but only when the given value has been exceeded for a given period of time.

In order to arrange the material in horizontal layers, when the silo is being filled, the vertical, transverse bars 13 may be provided with rake members 18, which extend as far as beneath the wheels 14 and which thus rake the product to flatness during the rotation of the skeleton. After the silo has been filled, these rake members are removed.

The cylindrical silo wall is constructed from substantially rectangular, slightly cylindrically curved sheets provided with flanges. In the embodiment shown in FIG. 6 the sheets are provided on two curved sides and one straight side with flanges, whereas the other straight side is not provided with flanges. The flanges on the curved sides have bolt holes for fastening to higher and lower sheets. This mode of fastening is shown on an enlarged scale in FIG. 9, in which two sheets 1 engaging one another by the flanges 21 and 20 are secured in place by means of bolts 19 passed through the holes in said flanges. The sheets are horizontally connected by means of welding seams as shown on an enlarged scale in the sectional view of FIG. 8, where the flange 22 only serves for enhancing the resistance to bending. This flange 22 is provided at both ends with bent-over tags 22', engaging the flanges 20 and 21 and being secured thereto by means of a bolt 19 as is clearly shown in FIG. 7. As a matter of course, the flange 22 may also be connected by a welding seam with the flanges 20 and 21.

In order to restrict the volume of the silo during transport the cylinder is preferably constructed from at least two groups of sheets, in which groups the distance between the flanges on the curved sides differs by slightly more than twice the thickness of the material from that in a further group. FIGS. 13 and 14 are sectional views of three sheets associated with different groups. The arc length of the three sheets is the same, but the height is each time largely twice the thickness of the material smaller so that in transport the three sheets fit into one another. When erecting the silo rings of sheets having equal heights are assembled.

A further possibility of restricting the transported volume resides in that the sheets are provided only on two adjacent sides with flanges, which prevent sagging of the sheets, but which do not serve in their relative connection. FIG. 10 shows part of the silo wall assembled from such sheets, which are shown in an elevational view in FIG. 11 and in a horizontal sectional view in FIG. 12. The sheet 23 is provided on one straight side with a flange 24, which has at both ends a bent-over tag 25 and on one adjacent, curved side it is provided with a flange 26. The flange 26 is provided at both ends and at the center with a bolt hole as well as the two tags 25. The further holes for joining the sheets 23a are provided in the rims of the main portion but not in the flanges. By disposing the flanges 26 in a slightly inclined position relative to the row of bolt holes on the opposite side so that the distance between them on the straight side without flange exceeds that on the other side by one thickness of the sheet, the flanges 26 can be arranged in a roof-tile fashion one on the other as is shown in FIG. 10. The row of bolt holes at the side of the flange 24 and the opposite row of bolt holes diverge to an extent such that when a number of sheets are assembled to form a ring, the inner diameter on one side of the ring is equal to the outer diameter on the other side thereof. FIGS. 11 and 12 show that the flange 24 is stiffened on the straight side by a tag 27 bent back approximately parallel to the main portion of the sheet and enhancing further the resistance of the flange to bending.

The delivery tube 4 with the suction nozzle 5 communicates through a telescopic connection with a delivery conduit 28 passing through the roof 10 and extending subsequently along the roof and vertically down along the sidewall of the silo. The vertical portion of the delivery conduit is connected with the silo wall by means of a cage construction, part of which is formed by the ladder 29. This cage structure protects persons climbing the ladder. The delivery conduit comprises cylindrical tubings 30, among which tubings 31 are detachable from the superjacent tube portion and can then be telescopically lowered with respect to the subjacent tube portion so that via a bend a horizontal tube can be connected, which is passed through a local hatch 32 in the silo wall to the interior of the silo where it can be connected with the telescopic connection of the delivery tube 4.

In accordance with the filling height of the silo the frame 2 with the delivery tube 4 journalled in it is lowered by the cables 8 until the pinned wheels 14 come into contact with the material in the silo and the suction nozzle 5 can suck up the material collected by the wheels into an annular heap. For further conveyance the delivery tube 4 is connected through a suitable hatch with the vertical delivery conduit 28.

Whilst the guide rollers 7 at the ends of the arms 6 move along the silo wall, there is a risk that material stored in the silo gets jammed between the rollers 7 and the inner wall of the silo so that the frame may become blocked. This is avoided by providing the frame with protective hoods 33 projecting above said rollers and located on the top side at a distance of 3 to 12 mms from the silo wall so that the material stored in the silo is effectively shifted away for the rollers.

If the silo is filled with very solid material, it is advantageous to replace the pins 15 on the wheels 14 by triangular knives.

The sheet shown in FIG. 10 may be depressed in a simpler manner at the right-hand top corner and slightly to the right of the centre of the top side rather than on diagonally opposite corners.

What we claim is:

1. In a silo having a cylindrical wall for containing material such as ensilage, a frame disposed within said silo and including a bearing disposed centrally of the silo, means for raising and lowering said frame within said silo, a delivery tube rotatably journalled in said bearing and having an inlet section extending radially outwardly therefrom and terminating in an inlet mouth at a position located between the center of said silo and said cylindrical wall and in spaced relation to both, means for rotating said delivery tube so that said inlet mouth follows a circular path at said position, and conveying means rotated with said delivery tube and having first conveying elements disposed radially outwardly of said path for feeding ensilage inwardly from said cylindrical wall to said path followed by said inlet mouth and second conveying elements disposed radially inwardly of said path for feeding ensilage outwardly from the center of the silo to said path followed by said inlet mouth, said conveying means comprising a plurality of radially extending and circumferentially spaced arms, said first and second conveying elements being formed as wheels connected to said arms, and rigid rake elements depending from said arms and projecting below said wheels, said rake elements being movable to positions in which they do not project below said wheels.

2. In a silo having a cylindrical wall for containing material such as ensilage, a frame disposed within said silo and including a bearing disposed centrally of the silo, means for raising and lowering said frame within said silo, a delivery tube rotatably journalled in said bearing and having an inlet section extending radially outwardly therefrom and terminating in an inlet mouth at a position located between the center of said silo and said cylindrical wall and in spaced relation to both, means for rotating said delivery tube so that said inlet mouth follows a circular path at said position, and conveying means rotated with said delivery tube and having first conveying elements disposed radially outwardly of said path for feeding ensilage inwardly from said cylindrical wall to said path followed by said inlet mouth and second conveying elements disposed radially inwardly of said path for feeding ensilage outwardly from the center of the silo to said path followed by said inlet mouth, said conveying means comprising a plurality of radially extending and circumferentially spaced arms connected at their inner ends to said delivery tube at a location below said bearing means, said first conveying elements comprising a first set of wheels distributed on said arms at different radial positions so as cumulatively to provide a radial spacing between wheels which effects the radial inward conveying of material to said path, and said second conveying elements comprising a second set of wheels distributed on said arms at different radial positions so as cumulatively to provide a radial spacing between the second set of wheels which effects the radial outward conveying of material to said path.

3. In a silo as defined in claim 2 wherein said inlet section extends radially in circumferentially spaced relation between adjacent pair of said arms whereby said inlet mouth likewise is disposed between such arms.

4. In a silo having a cylindrical wall for containing material such as ensilage, a frame disposed within said silo and including a bearing disposed centrally of the silo, means for raising and lowering said frame within said silo, a delivery tube rotatably journalled in said bearing and having an inlet section extending radially outwardly therefrom and terminating in an inlet mouth at a position located between the center of said silo and said cylindrical wall and in spaced relation to both, means for rotating said delivery tube so that said inlet mouth follows a circular path at said position, and conveying means rotated with said delivery tube and having first conveying elements disposed radially outwardly of said path for feeding ensilage inwardly from said cylindrical wall to said path followed by said inlet mouth and second conveying elements disposed radially inwardly of said path for feeding ensilage outwardly from the center of the silo to said path followed by said inlet mouth, said cylindrical wall being constructed from substantially rectangular, slightly cylindrically curved, flanged sheets provided all around with bolt holes, characterized in that at least on one straight side the sheets are not provided with a flange, whereas at least two adjacent sides are provided with a flange, said sheets being provided with flanges on three sides, the cylinder wall being constructed from at least two groups of sheets and in that with each group the distance between the flanges on the curved sides differs by slightly more than twice the thickness of the material from that of a further group.

* * * * *